(12) United States Patent
Natoli

(10) Patent No.: US 9,819,170 B2
(45) Date of Patent: Nov. 14, 2017

(54) SEAL ASSEMBLY/ADAPTOR FOR AN INTERFACE PORT

(71) Applicant: John Mezzalingua Associates, LLC, Liverpool, NY (US)

(72) Inventor: Christopher P. Natoli, Baldwinsville, NY (US)

(73) Assignee: John Mezzalingua Associates, LLC, Liverpool, NY (US)

( * ) Notice: Subject to any disclaimer, the term of this patent is extended or adjusted under 35 U.S.C. 154(b) by 126 days.

(21) Appl. No.: 14/751,715

(22) Filed: Jun. 26, 2015

(65) Prior Publication Data
US 2015/0380920 A1     Dec. 31, 2015

Related U.S. Application Data

(60) Provisional application No. 62/018,011, filed on Jun. 27, 2014.

(51) Int. Cl.
| | | |
|---|---|---|
| *H01R 13/52* | (2006.01) | |
| *H02G 15/04* | (2006.01) | |
| *H02G 3/06* | (2006.01) | |
| *H02G 3/08* | (2006.01) | |

(52) U.S. Cl.
CPC ........... *H02G 15/04* (2013.01); *H02G 3/0616* (2013.01); *H02G 3/088* (2013.01)

(58) Field of Classification Search
CPC ............ H01R 13/5219; H01R 13/5221; H01R 24/564; H01R 9/05; H02G 15/04; H02G 3/0616; H02G 3/088
See application file for complete search history.

(56) References Cited

U.S. PATENT DOCUMENTS

| | | | |
|---|---|---|---|
| 7,094,094 B2 | 8/2006 | Zahnen et al. | |
| 7,264,503 B2 | 9/2007 | Montena | |
| 7,572,155 B2 | 8/2009 | Elliott, III et al. | |
| 7,611,379 B2 | 11/2009 | Elliott, III et al. | |
| 8,529,288 B2 | 9/2013 | Montena et al. | |
| 8,579,658 B2 | 11/2013 | Youtsey | |
| 8,764,480 B2 | 7/2014 | Natoli et al. | |
| 9,028,276 B2 | 5/2015 | Wilson et al. | |
| 2005/0164553 A1* | 7/2005 | Montena ............ | H01R 9/0518 439/578 |
| 2012/0315780 A1* | 12/2012 | Montena ............ | H01R 13/5219 439/275 |
| 2014/0045356 A1* | 2/2014 | Natoli ................ | H01R 13/5205 439/272 |

\* cited by examiner

*Primary Examiner* — Gilbert Lee
(74) *Attorney, Agent, or Firm* — Barclay Damon LLP

(57) ABSTRACT

A seal assembly/adaptor for sealing a weather protection boot to an irregular shaped interface port such as a port having externally facing threads. The seal assembly/adaptor includes a seal subassembly comprising a compliant ring having plurality of arcuate segments defining an opening for accepting the interface port. Further, the seal assembly/adaptor includes at least one retainer operative to retain the seal subassembly such that, upon assembly, an axial force imparted by a connector coupling device effects radial deformation of at least one of the flexible segments into the irregular surface of the interface port to effect a seal between the irregular surface and the retainer.

24 Claims, 18 Drawing Sheets

SEAL ASSEMBLY/ADAPTOR FOR AN INTERFACE PORT

CROSS-REFERENCE TO RELATED APPLICATIONS

This application is a non-provisional patent application of, and claims the benefit and priority of, U.S. Provisional Patent Application No. 62/018,011, filed on Jun. 27, 2014. The entire contents of such application are hereby incorporated by reference.

BACKGROUND

Coaxial cables are typically connected to interface ports, or corresponding connectors, for the operation of various electronic devices, such as cellular communications towers. Coaxial cables are installed on cellular towers, outdoors in harsh environments, subjecting the cable connections to rain, snow, ice, wind and other elements. To protect the connectors from the elements, a variety of boots/sleeves are available to cover and protect at least a portion of the cable connections. Certain cable connectors, however, must attach to interface ports having irregular surfaces, e.g., a threaded surface, which can be difficult to protect due to problems associated with producing a reliable seal over such irregular surfaces. As a result, the environmental elements can penetrate the cable connections causing problems with cellular communications.

Accordingly, there is a need to overcome, or otherwise lessen the effects of, the disadvantages and shortcomings described above.

SUMMARY

A seal assembly/adaptor is for sealing a weather protection boot to an irregular shaped interface port such as a port having externally facing threads. The seal assembly/adaptor includes a seal subassembly comprising a compliant ring having plurality of arcuate segments defining an opening for accepting the interface port. Further, the seal assembly/adaptor includes at least one retainer operative to retain the seal subassembly such that an axial force imparted by a connector coupling device effects radial deformation of at least one of the flexible segments into the irregular surface of the interface port to effect an environmental seal between the irregular surface and the retainer.

In one embodiment, a seal assembly is provided for a threaded interface port comprising a resilient seal, a radial retainer receiving the resilient seal within a first cavity and an axial retainer receiving the radial retainer and resilient seal within a second cavity. The resilient seal is deformable and comprises at least one flexible segment defining an opening having a dimension. The axial retainer is configured to engage the threads of the interface port and position the seal against a coupling device of a coaxial cable connector. Furthermore, the radial and axial retainers are configured to engage surfaces of the resilient seal such that, in response to an axial load imposed by a coupling device of a coaxial cable connector, the dimension of the opening decreases. As the opening decreases, at least one flexible segment engages a spiral thread of the interface port to effect an environmental seal.

BRIEF DESCRIPTION OF THE DRAWINGS

Additional features and advantages of the present disclosure are described in, and will be apparent from, the following Brief Description of the Drawings and Detailed Description.

DETAILED DESCRIPTION

Wireless Communication Networks

In one embodiment, wireless communications are operable based on a network switching subsystem ("NSS"). The NSS includes a circuit-switched core network for circuit-switched phone connections. The NSS also includes a general packet radio service architecture which enables mobile networks, such as 2G, 3G and 4G mobile networks, to transmit Internet Protocol ("IP") packets to external networks such as the Internet. The general packet radio service architecture enables mobile phones to have access to services such as Wireless Application Protocol ("WAP"), Multimedia Messaging Service ("MSS") and the Internet.

A service provider or carrier operates a plurality of centralized mobile telephone switching offices ("MTSOs"). Each MTSO controls the base stations within a select region or cell surrounding the MTSO. The MTSOs also handle connections to the Internet and phone connections.

Figure 1:
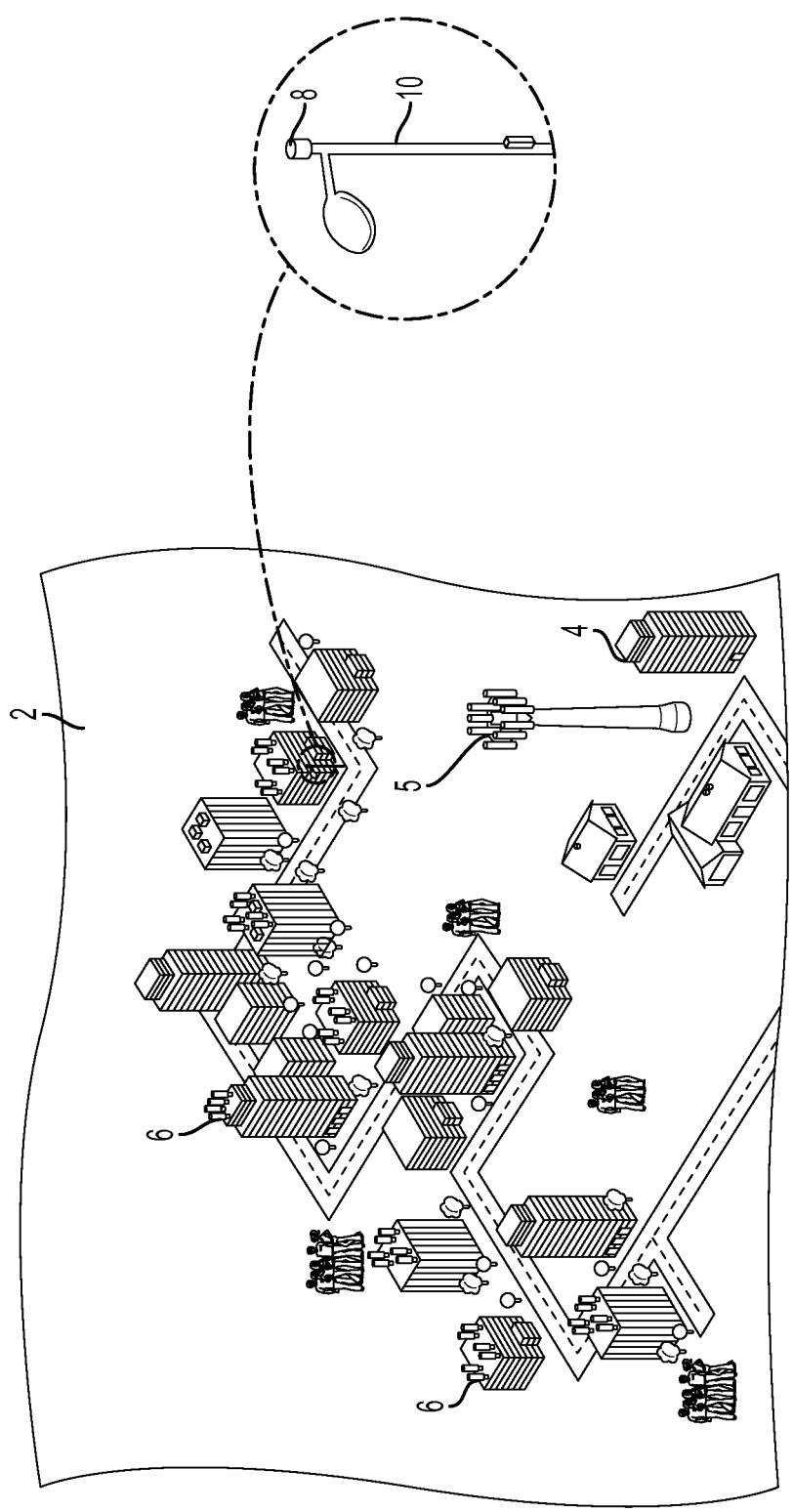
FIG. 1 is a schematic diagram illustrating an example of one embodiment of an outdoor wireless communication network.

Referring to FIG. 1, an outdoor wireless communication network 2 includes a cell site or cellular base station 4. The base station 4, in conjunction with cellular tower 5, serves communication devices, such as mobile phones, in a defined area surrounding the base station 4. The cellular tower 5 also communicates with macro antennas 6 on building tops as well as micro antennas 8 mounted to, for example, street lamps 10.

The cell size depends upon the type of wireless network. For example, a macro cell can have a base station antenna installed on a tower or a building above the average rooftop level, such as the macro antennas 5 and 6. A micro cell can have an antenna installed at a height below the average rooftop level, often suitable for urban environments, such as the street lamp-mounted micro antenna 8. A picocell is a relatively small cell often suitable for indoor use.

Figure 2:
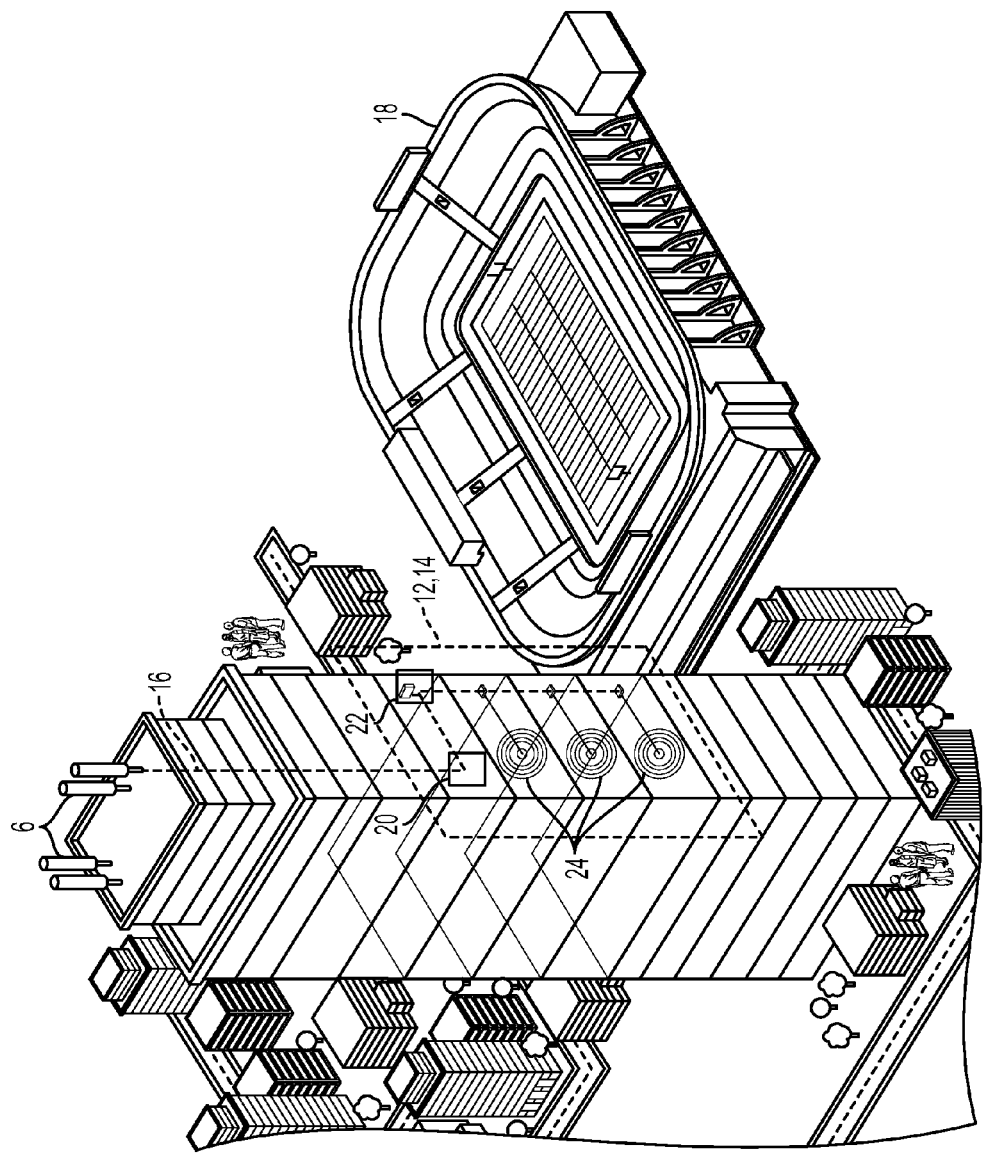
FIG. 2 is a schematic diagram illustrating an example of one embodiment of an indoor wireless communication network.

As illustrated in FIG. 2, an indoor wireless communication network 12 includes an active distributed antenna system ("DAS") 14. The DAS 14 can, for example, be installed in a high rise commercial office building 16, a sports stadium 8 or a shopping mall. In one embodiment, the DAS 14 includes macro antennas 6 coupled to a radio frequency ("RF") repeater 20. The macro antennas 6 receive signals from a nearby base station. The RF repeater 20 amplifies and repeats the received signals. The RF repeater 20 is coupled to a DAS master unit 22 which, in turn, is coupled to a plurality of remote antenna units 24 distributed throughout the building 16. Depending upon the embodiment, the DAS master unit 22 can manage over one hundred remote antenna units 24 in a building. In operation, the master unit 22, as programmed and controlled by a DAS manager, is operable to control and manage the coverage and performance of the remote antenna units 24 based on the number of repeated signals fed by the repeater 20. It should be appreciated that a technician can remotely control the master unit 22 through a Local Area Network (LAN) connection or wireless modem.

Depending upon the embodiment, the RF repeater 20 can be an analog repeater that amplifies all received signals, or the RF repeater 20 can be a digital repeater. In one embodiment, the digital repeater includes a processor and a memory device or data storage device. The data storage device stores logic in the form of computer-readable instructions. The processor executes the logic to filter or clean the received signals before repeating the signals. In one embodiment, the digital repeater does not need to receive signals from an external antenna, but rather, has a built-in antenna located within its housing.

Base Stations

Figure 3:
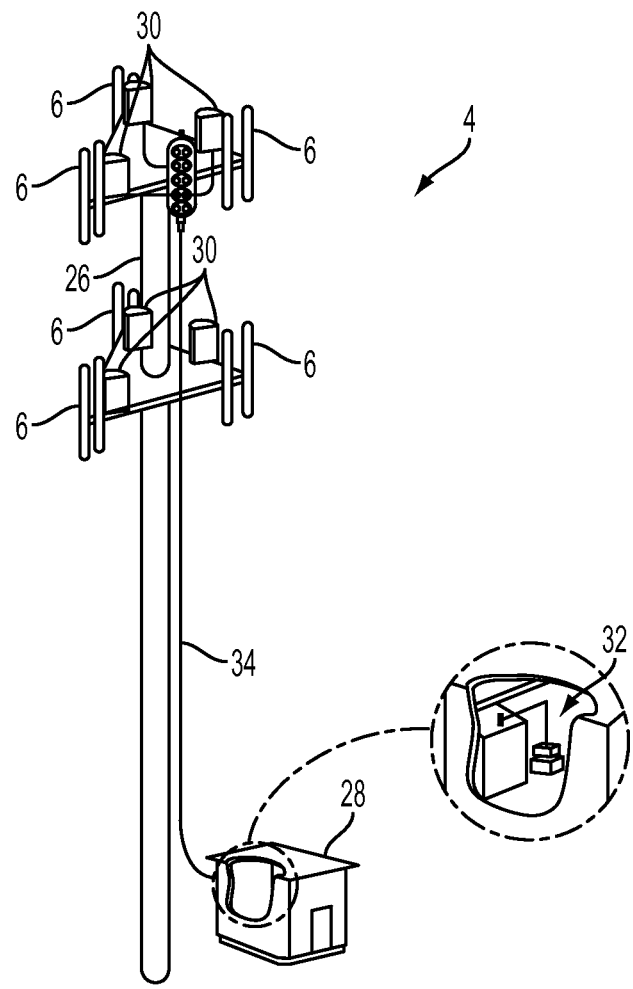
FIG. 3 is an isometric view of one embodiment of a base station illustrating a tower and ground shelter.

In one embodiment illustrated in FIG. 3, the base station 4 includes a tower 26 and a ground shelter 28 proximal to the tower 26. In this example, a plurality of exterior antennas 6 and remote radio heads 30 are mounted to the tower 26. The shelter 28 encloses base station equipment 32. Depending upon the embodiment, the base station equipment 32 includes electrical hardware operable to transmit and receive radio signals and to encrypt and decrypt communications with the MTSO. The base station equipment 32 also includes power supply units and equipment for powering and controlling the antennas and other devices mounted to the tower 26.

In one embodiment, a distribution line 34, such as coaxial cable or fiber optic cable, distributes signals that are exchanged between the base station equipment 32 and the remote radio heads 30. Each remote radio head 30 is operatively coupled, and mounted adjacent, a group of associated macro antennas 6. Each remote radio head 30 manages the distribution of signals between its associated macro antennas 6 and the base station equipment 30. In one embodiment, the remote radio heads 30 extend the coverage and efficiency of the macro antennas 6. The remote radio heads 30, in one embodiment, have RF circuitry, analog-to-digital/digital-to-analog converters and up/down converters.

Antennas

The antennas, such as macro antennas 6, micro antennas 8 and remote antenna units 24, are operable to receive signals from communication devices and send signals to the communication devices. Depending upon the embodiment, the antennas can be of different types, including, but not limited to, directional antennas, omni-directional antennas, isotropic antennas, dish-shaped antennas, and microwave antennas. Directional antennas can improve reception in higher traffic areas, along highways, and inside buildings like stadiums and arenas. Based upon applicable laws, a service provider may operate omni-directional cell tower signals up to a maximum power, such as 100 watts, while the service provider may operate directional cell tower signals up to a higher maximum of effective radiated power ("ERP"), such as 500 watts.

An omni-directional antenna is operable to radiate radio wave power uniformly in all directions in one plane. The radiation pattern can be similar to a doughnut shape where the antenna is at the center of the donut. The radial distance from the center represents the power radiated in that direction. The power radiated is maximum in horizontal directions, dropping to zero directly above and below the antenna.

An isotropic antenna is operable to radiate equal power in all directions and has a spherical radiation pattern. Omni-directional antennas, when properly mounted, can save energy in comparison to isotropic antennas. For example, since their radiation drops off with elevation angle, little radio energy is aimed into the sky or down toward the earth where it could be wasted. In contrast, isotropic antennas can waste such energy.

In one embodiment, the antenna has: (a) a transceiver moveably mounted to an antenna frame; (b) a transmitting data port, a receiving data port, or a transceiver data port; (c) an electrical unit having a PC board controller and motor; (d) a housing or enclosure that covers the electrical unit; and (e) a drive assembly or drive mechanism that couples the motor to the antenna frame. Depending upon the embodiment, the transceiver can be tiltably, pivotably or rotatably mounted to the antenna frame. One or more cables connect the antenna's electrical unit to the base station equipment 32 for providing electrical power and motor control signals to the antenna. A technician of a service provider can reposition the antenna by providing desired inputs using the base station equipment 32. For example, if the antenna has poor reception, the technician can enter tilt inputs to change the tilt angle of the antenna from the ground without having to climb up to reach the antenna. As a result, the antenna's motor drives the antenna frame to the specified position. Depending upon the embodiment, a technician can control the position of the moveable antenna from the base station, from a distant office or from a land vehicle by providing inputs over the Internet.

Data Interface Ports

Generally, the networks 2 and 12 include a plurality of wireless network devices, including, but not limited to, the base station equipment 32, one or more radio heads 30, macro antennas 6, micro antennas 8, RF repeaters 20 and remote antenna units 24. As described above, these network devices include data interface ports which couple to connectors of signal-carrying cables, such as coaxial cables and fiber optic cables. In the example illustrated in FIG. 4, the tower 36 supports a radio head 38 and macro antenna 40. The radio head 38 has interface ports 42, 43 and 44 and the macro antenna 40 has antenna ports 45 and 47. In the example shown, the coaxial cable 48 is connected to the radio head interface port 42, while the coaxial cable jumpers 50 and 51 are connected to radio head interface ports 44 and 45, respectively. The coaxial cable jumpers 50 and 51 are also connected to antenna interface ports 45 and 47, respectively.

The interface ports of the networks 2 and 12 can have different shapes, sizes and surface types depending upon the embodiment. In one embodiment illustrated in FIG. 5, the interface port 52 has a tubular or cylindrical shape. The interface port 52 includes: (a) a forward end or base 54 configured to abut the network device enclosure, housing or wall 56 of a network device; (b) a coupler engager 58 configured to be engaged with a cable connector's coupler, such as a nut; (c) an electrical ground 60 received by the coupler engager 58; and (d) a signal carrier 62 received by the electrical grounder 60.

Figure 6:
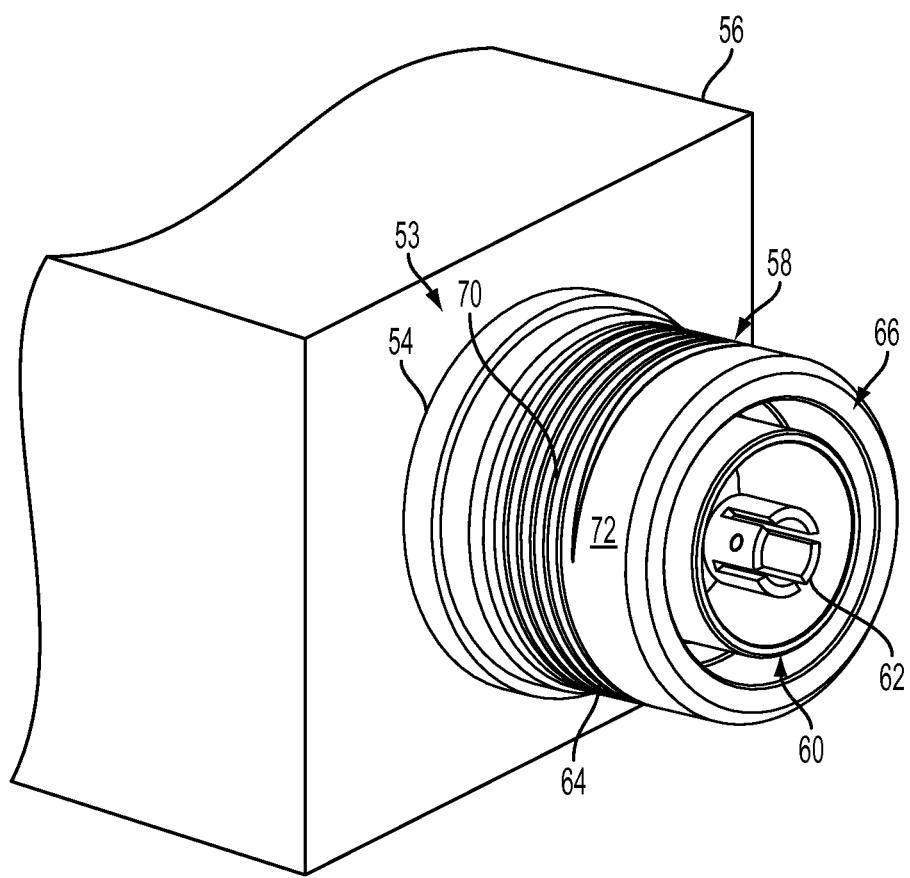
FIG. 6 is an isometric view of another embodiment of an interface port.
Figure 7:
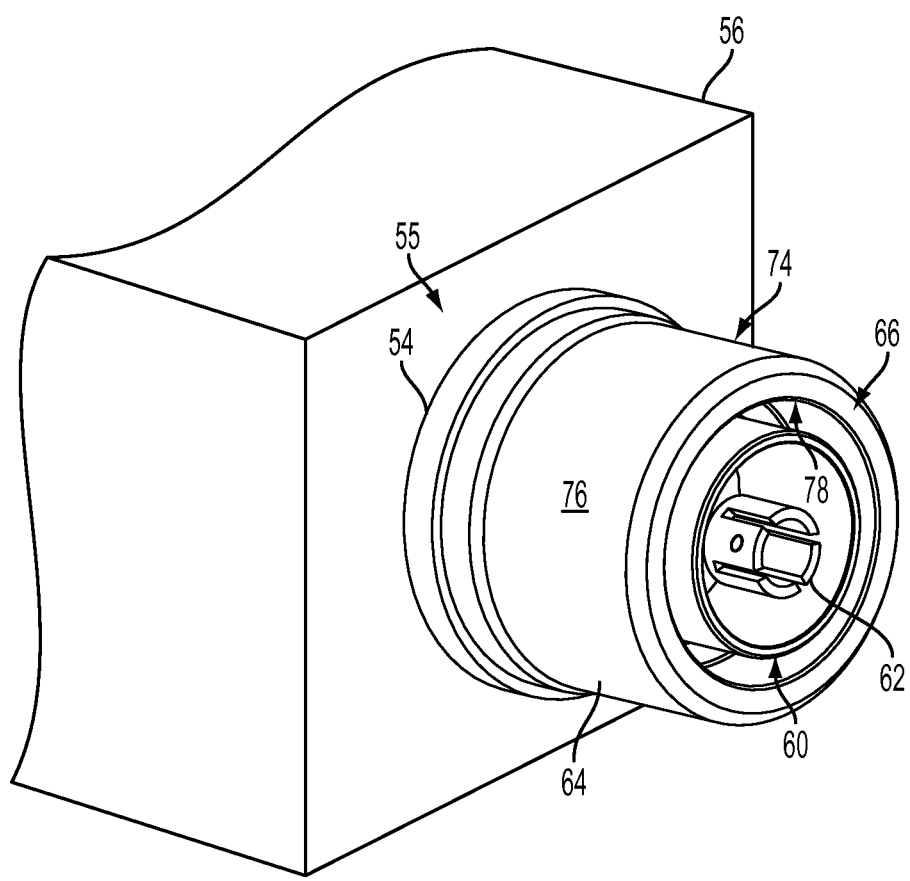
FIG. 7 is an isometric view of yet another embodiment of an interface port.

In the illustrated embodiment, the base 54 has a collar shape with a diameter larger than the diameter of the coupler engager 58. The coupler engager 58 is tubular in shape, has a threaded, outer surface 64 and a rearward end 66. The threaded outer surface 64 is configured to threadably mate with the threads of the coupler of a cable connector, such as connector 68 described below. In one embodiment illustrated in FIG. 6, the interface port 53 has a forward section 70 and a rearward section 72 of the coupler engager 62. The forward section 70 is threaded, and the rearward section 72 is non-threaded. In another embodiment illustrated in FIG. 7, the interface port 55 has a coupler engager 74. In this embodiment, the coupler engager 74 is the same as coupler engager 58 except that it has a non-threaded, outer surface 76 and a threaded, inner surface 78. The threaded, inner surface 78 is configured to be inserted into, and threadably engaged with, a cable connector.

Referring to FIGS. 5-8, in one embodiment, the signal carrier 62 is tubular and configured to receive a pin or inner conductor engager 80 of the cable connector 68. Depending upon the embodiment, the signal carrier 62 can have a plurality of fingers 82 which are spaced apart from each other about the perimeter of the signal carrier 80. When the cable inner conductor 84 is inserted into the signal carrier 80, the fingers 82 apply a radial, inward force to the inner conductor 84 to establish a physical and electrical connection with the inner conductor 84. The electrical connection enables data signals to be exchanged between the devices that are in communication with the interface port. In one embodiment, the electrical ground 60 is tubular and configured to mate with a connector ground 86 of the cable connector 68. The connector ground 86 extends an electrical ground path to the ground 64 as described below.

Cables

In one embodiment illustrated in FIGS. 4 and 8-10, the networks 2 and 12 include one or more types of coaxial cables 88. In the embodiment illustrated in FIG. 8, the coaxial cable 88 has: (a) a conductive, central wire, tube, strand or inner conductor 84 that extends along a longitudinal axis 92 in a forward direction F toward the interface port 56; (b) a cylindrical or tubular dielectric, or insulator 96 that receives and surrounds the inner conductor 84; (c) a conductive tube or outer conductor 98 that receives and surrounds the insulator 96; and (d) a sheath, sleeve or jacket 100 that receives and surrounds the outer conductor 98. In the illustrated embodiment, the outer conductor 98 is corrugated, having a spiral, exterior surface 102. The exterior surface 102 defines a plurality of peaks and valleys to facilitate flexing or bending of the cable 88 relative to the longitudinal axis 92.

Figure 8:
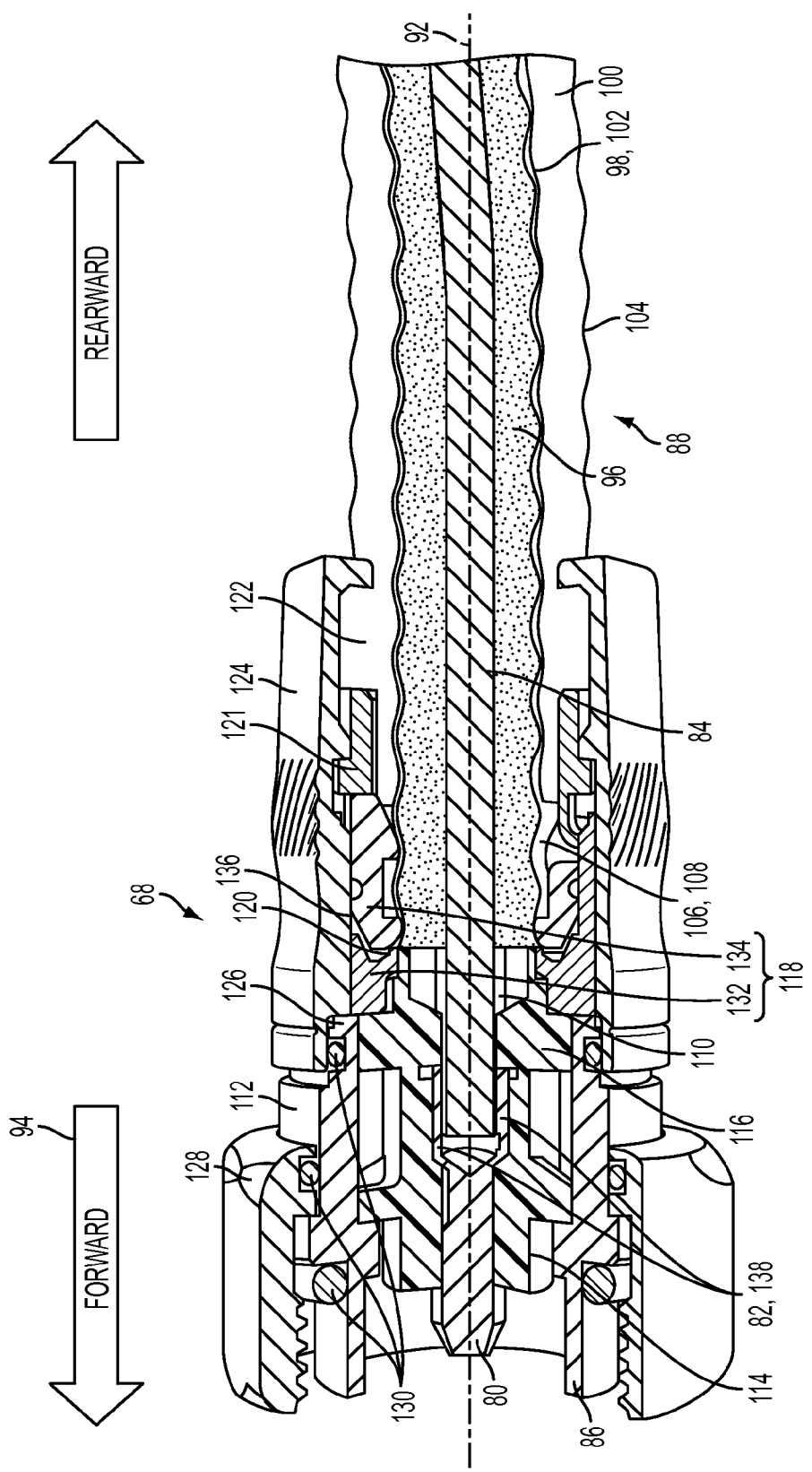
FIG. 8 is an isometric, cut-away view of one embodiment of a cable connector and cable.

To achieve the cable configuration shown in FIG. 8, an assembler/preparer, in one embodiment, takes one or more steps to prepare the cable 90 for attachment to the cable connector 68. In one example, the steps include: (a) removing a longitudinal section of the jacket 104 to expose the bare surface 106 of the outer conductor 108; (b) removing a longitudinal section of the outer conductor 108 and insulator 96 so that a protruding end 110 of the inner conductor 84 extends forward, beyond the recessed outer conductor 108 and the insulator 96, forming a step-shape at the end of the cable 68; (c) removing or coring-out a section of the recessed insulator 96 so that the forward-most end of the outer conductor 106 protrudes forward of the insulator 96.

In another embodiment not shown, the cables of the networks 2 and 12 include one or more types of fiber optic cables. Each fiber optic cable includes a group of elongated light signal guides or flexible tubes. Each tube is configured to distribute a light-based or optical data signal to the networks 2 and 12.

Connectors

In the embodiment illustrated in FIG. 8, the cable connector 68 includes: (a) a connector housing or connector body 112; (b) a connector insulator 114 received by, and housed within, the connector body 112; (c) the inner conductor engager 80 received by, and slidably positioned within, the connector insulator 114; (d) a driver 116 configured to axially drive the inner conductor engager 80 into the connector insulator 114 as described below; (e) an outer conductor clamp device or outer conductor clamp assembly 118 configured to clamp, sandwich, and lock onto the end section 120 of the outer conductor 106; (f) a clamp driver 121; (g) a tubular-shaped, deformable, environmental seal 122 that receives the jacket 104; (h) a compressor 124 that receives the seal 122, clamp driver 121, clamp assembly 118, and the rearward end 126 of the connector body 112; (i) a nut, fastener or coupler 128 that receives, and rotates relative to, the connector body 112; and (j) a plurality of O-rings or ring-shaped environmental seals 130. The environmental seals 122 and 130 are configured to deform under pressure so as to fill cavities to block the ingress of environmental elements, such as rain, snow, ice, salt, dust, debris and air pressure, into the connector 68.

In one embodiment, the clamp assembly 118 includes: (a) a supportive outer conductor engager 132 configured to be inserted into part of the outer conductor 106; and (b) a compressive outer conductor engager 134 configured to mate with the supportive outer conductor engager 132. During attachment of the connector 68 to the cable 88, the cable 88 is inserted into the central cavity of the connector 68. Next, a technician uses a hand-operated, or power, tool to hold the connector body 112 in place while axially pushing the compressor 124 in a forward direction F. For the purposes of establishing a frame of reference, the forward direction F is toward interface port 55 and the rearward direction R is away from the interface port 55.

The compressor 124 has an inner, tapered surface 136 defining a ramp and interlocks with the clamp driver 121. As the compressor 124 moves forward, the clamp driver 121 is urged forward which, in turn, pushes the compressive outer conductor engager 134 toward the supportive outer conductor engager 132. The engagers 132 and 134 sandwich the outer conductor end 120 positioned between the engagers 132 and 134. Also, as the compressor 124 moves forward, the tapered surface or ramp 136 applies an inward, radial force that compresses the engagers 132 and 134, establishing a lock onto the outer conductor end 120. Furthermore, the compressor 124 urges the driver 121 forward which, in turn, pushes the inner conductor engager 80 into the connector insulator 114.

The connector insulator 114 has an inner, tapered surface with a diameter less than the outer diameter of the mouth or grasp 138 of the inner conductor engager 80. When the driver 116 pushes the grasp 138 into the insulator 114, the diameter of the grasp 138 is decreased to apply a radial, inward force on the inner conductor 84 of the cable 88. As a consequence, a bite or lock is produced on the inner conductor 84.

Figure 5:
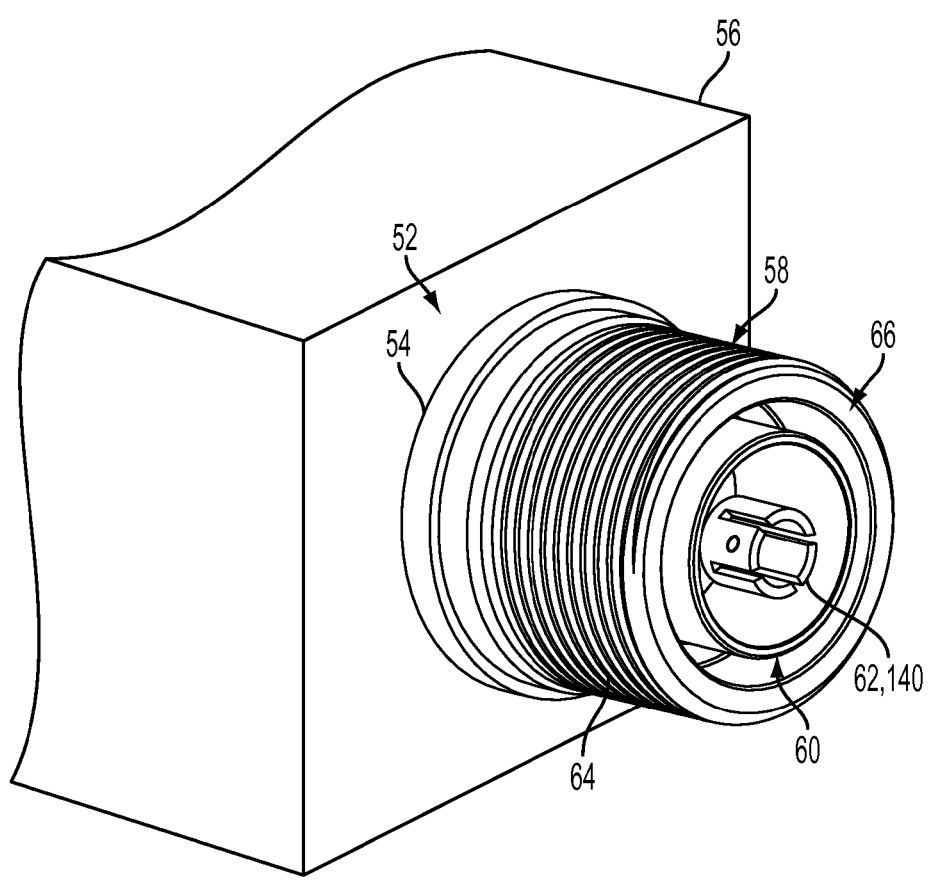
FIG. 5 is an isometric view of one embodiment of an interface port.

After the cable connector 68 is attached to the cable 88, a technician or user can install the connector 68 onto an interface port, such as the interface port 52 illustrated in FIG. 5. In one example, the user screws the coupler 128 onto the port 52 until the fingers 140 of the signal carrier 62 receive, and make physical contact with, the inner conductor engager 80 and until the ground 60 engages, and makes physical contact with, the outer conductor engager 86. During operation, the non-conductive, connector insulator 114 and the non-conductive driver 116 serve as electrical barriers between the inner conductor engager 80 and the one or more electrical ground paths surrounding the inner conductor engager 80. As a result, the likelihood of an electrical short is mitigated, reduced or eliminated. One electrical ground path extends: (i) from the outer conductor 106 to the clamp assembly 118, (ii) from the conductive clamp assembly 118 to the conductive connector body 112, and (iii) from the conductive connector body 112 to the conductive ground 60. An additional or alternative electrical grounding path extends: (i) from the outer conductor 106 to the clamp assembly 118, (ii) from the conductive clamp assembly 118 to the conductive connector body 112, (iii) from the conductive connector body 112 to the conductive coupler 128, and (iv) from the conductive coupler 128 to the conductive ground 60.

These one or more grounding paths provide an outlet for electrical current resulting from magnetic radiation in the vicinity of the cable connector 88. For example, electrical equipment operating near the connector 68 can have electrical current resulting in magnetic fields, and the magnetic fields could interfere with the data signals flowing through the inner conductor 84. The grounded outer conductor 106 shields the inner conductor 84 from such potentially interfering magnetic fields. Also, the electrical current flowing through the inner conductor 84 can produce a magnetic field that can interfere with the proper function of electrical equipment near the cable 88. The grounded outer conductor 106 also shields such equipment from such potentially interfering magnetic fields.

The internal components of the connector 68 are compressed and interlocked in fixed positions under relatively high force. These interlocked, fixed positions reduce the likelihood of loose internal parts that can cause undesirable levels of passive intermodulation ("PIM") which, in turn, can impair the performance of electronic devices operating on the networks 2 and 12. PIM can occur when signals at two or more frequencies mix with each other in a non-linear manner to produce spurious signals. The spurious signals can interfere with, or otherwise disrupt, the proper operation of the electronic devices operating on the networks 2 and 12. Also, PIM can cause interfering RF signals that can disrupt communication between the electronic devices operating on the networks 2 and 12.

In one embodiment where the cables of the networks 2 and 12 include fiber optic cables, such cables include fiber optic cable connectors. The fiber optic cable connectors operatively couple the optic tubes to each other. This enables the distribution of light-based signals between different cables and between different network devices.

Supplemental Grounding

Figure 4:
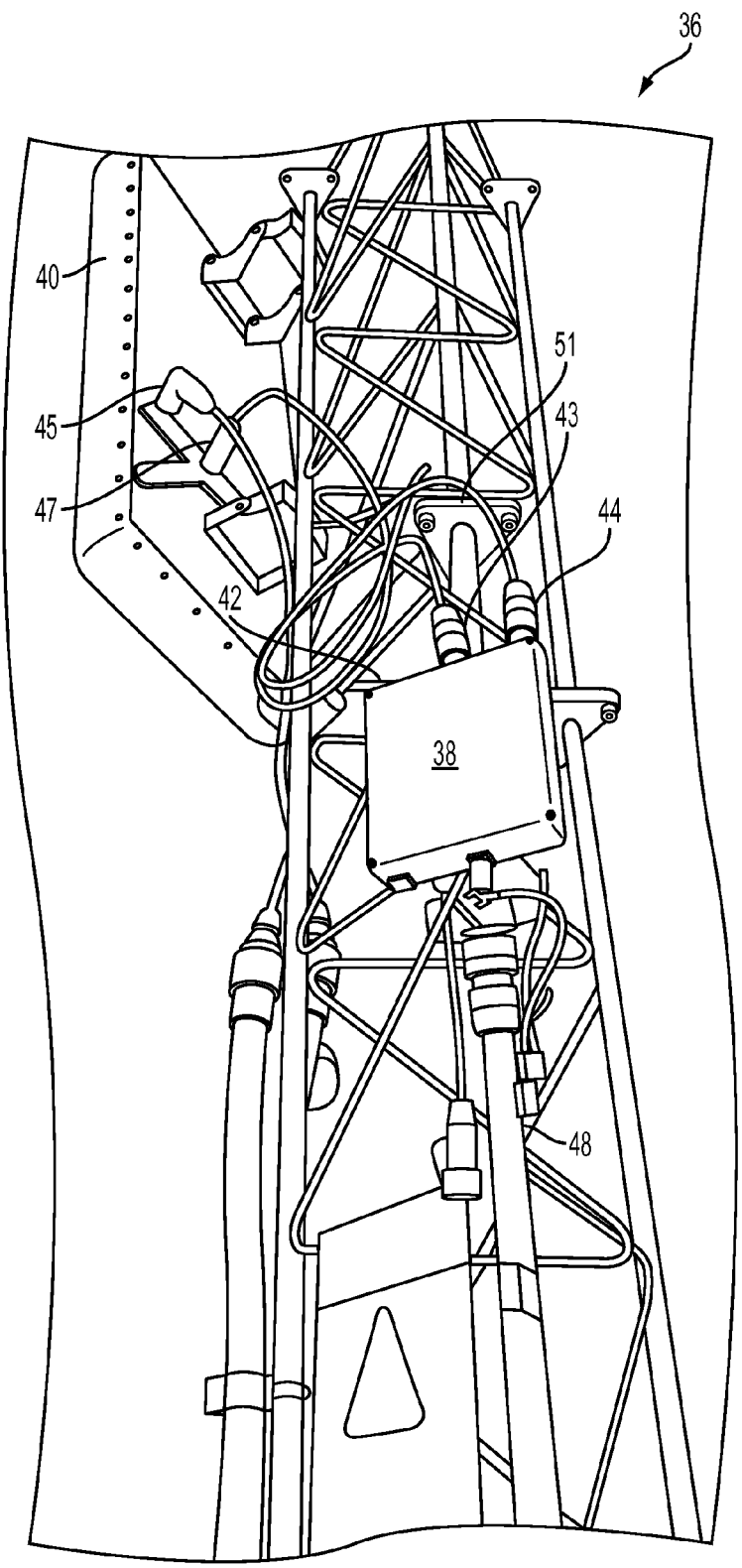
FIG. 4 is an isometric view of one embodiment of a tower.

In one embodiment, grounding devices are mounted to towers such as the tower 36 illustrated in FIG. 4. For example, a grounding kit or grounding device can include a grounding wire and a cable fastener which fastens the grounding wire to the outer conductor 106 of the cable 88. The grounding device can also include: (a) a ground fastener which fastens the ground wire to a grounded part of the tower 36; and (b) a mount which, for example, mounts the grounding device to the tower 23. In operation, the grounding device provides an additional ground path for supplemental grounding of the cables 88.

Environmental Protection

Figure 9:
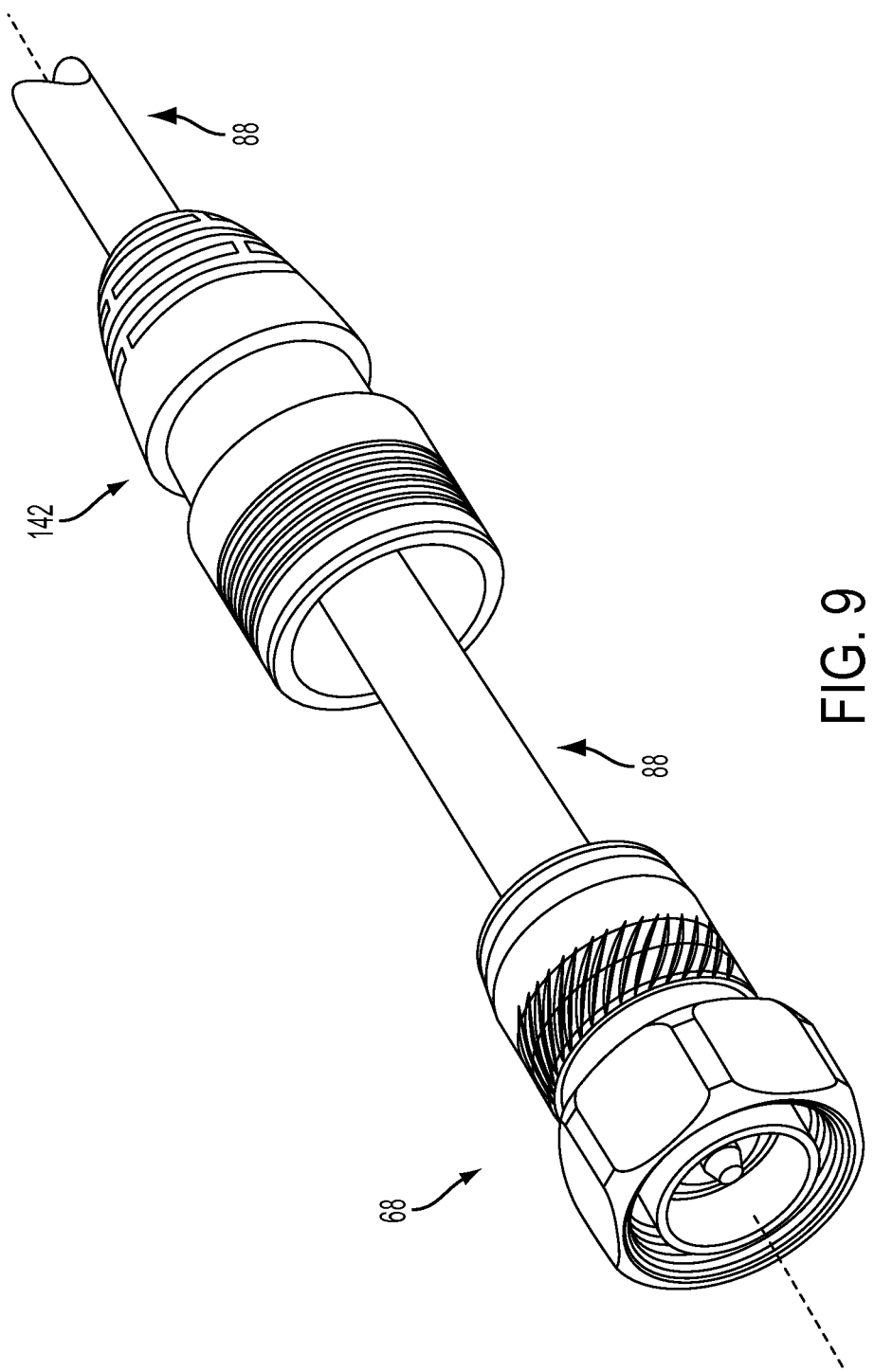
FIG. 9 is an isometric, exploded view of one embodiment of a cable assembly having a cover.
Figure 10:
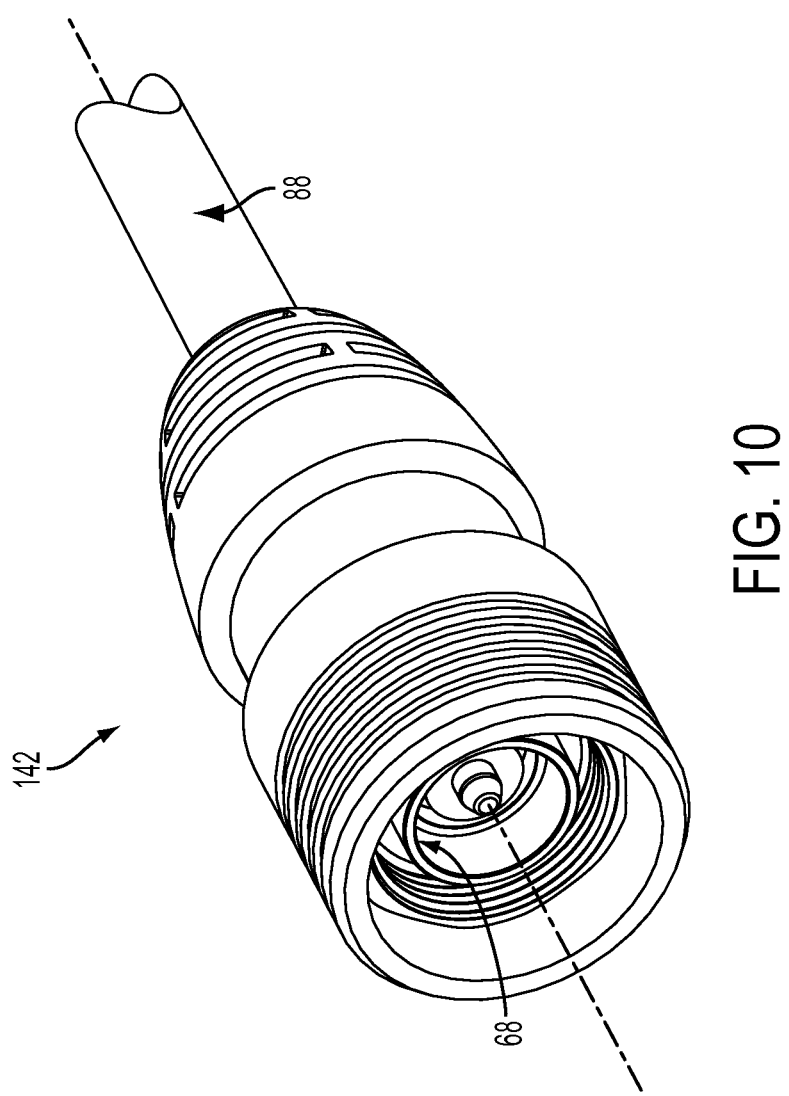
FIG. 10 is an isometric view of one embodiment of a cable connector covered by a cover.

In one embodiment, a protective boot or cover, such as the cover 142 illustrated in FIGS. 9-10, is configured to enclose part or all of the cable connector 88. In another embodiment, the cover 142 extends axially to cover the connector 68, the physical interface between the connector 68 and the interface port 52, and part or all of the interface port 52. The cover 142 provides an environmental seal to prevent the infiltration of environmental elements, such as rain, snow, ice, salt, dust, debris and air pressure, into the connector 68 and the interface port 52. Depending upon the embodiment, the cover 142 may have a suitable foldable, stretchable or flexible construction or characteristic. In one embodiment, the cover 142 may have a plurality of different inner diameters. Each diameter corresponds to a different diameter of the cable 88 or connector 68. As such, the inner surface of cover 142 conforms to, and physically engages, the outer surfaces of the cable 88 and the connector 68 to establish a tight environmental seal. The air-tight seal reduces cavities for the entry or accumulation of air, gas and environmental elements.

Materials

In one embodiment, the cable 88, connector 68 and interface ports 52, 53 and 55 have conductive components, such as the inner conductor 84, inner conductor engager 80, outer conductor 106, clamp assembly 118, connector body 112, coupler 128, ground 60 and the signal carrier 62. Such components are constructed of a conductive material suitable for electrical conductivity and, in the case of inner conductor 84 and inner conductor engager 80, data signal transmission. Depending upon the embodiment, such components can be constructed of a suitable metal or metal alloy including copper, but not limited to, copper-clad aluminum ("CCA"), copper-clad steel ("CCS") or silver-coated copper-clad steel ("SCCCS").

The flexible, compliant and deformable components, such as the jacket 104, environmental seals 122 and 130, and the cover 142 are, in one embodiment, constructed of a suitable, flexible material such as polyvinyl chloride (PVC), synthetic rubber, natural rubber or a silicon-based material. In one embodiment, the jacket 104 and cover 142 have a lead-free formulation including black-colored PVC and a sunlight resistant additive or sunlight resistant chemical structure. In one embodiment, the jacket 104 and cover 142 weatherize the cable 88 and connection interfaces by providing additional weather protective and durability enhancement characteristics. These characteristics enable the weatherized cable 88 to withstand degradation factors caused by outdoor exposure to weather.

Seal Assembly

Figure 11:
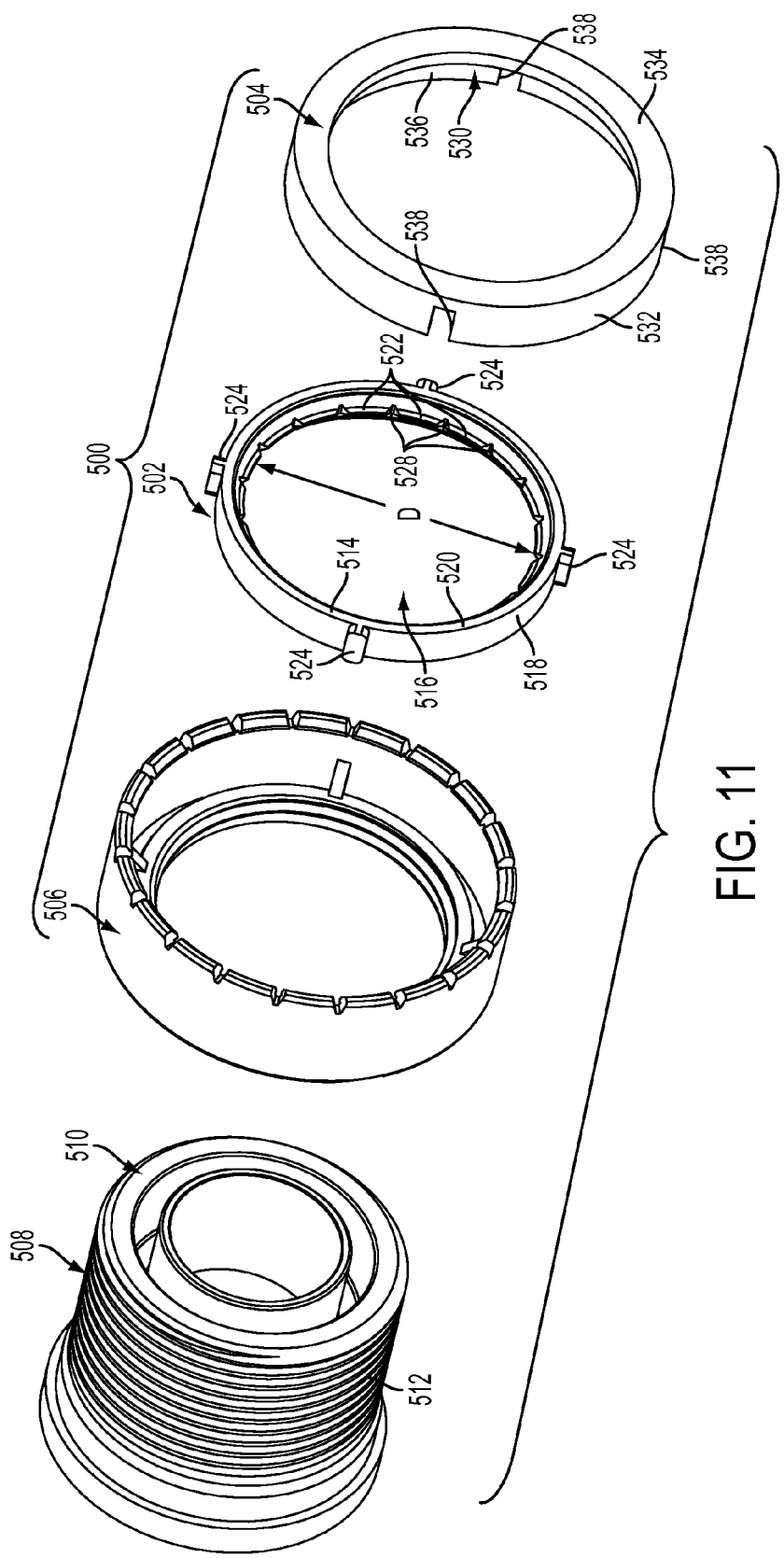
FIG. 11 depicts an exploded isometric view of a seal for a threaded interface according to one embodiment including a threaded interface port, an outer axial retainer or cylindrical ring, a deformable seal, and an inner radial retainer or compression ring.

Referring to FIG. 11, a seal assembly 500 for a weather protection system comprises a resilient, compliant or deformable seal 502, a radial seal retainer 504 and an axial seal retainer 506. In one embodiment, the resilient seal 502 produces a first seal with, or along, an irregular surface 508 of an interface port 510. In the described embodiment, the irregular surface comprises a plurality of the spiral threads 512 along the periphery of the interface port 510. Alternatively, the irregular surface may comprise a knurled, straight knurled, scored, or other non-linear surface along the periphery of the interface port 510.

The resilient seal 502 comprises an annular ring 514 having an opening 516 for receiving the interface port 510. The resilient seal 502 is compliant or deformable and composed of a flexible silicone rubber, foam rubber, natural rubber or elastomer material. While the resilient seal 502 forms an annular ring 514 having a circular opening 516, it will be appreciated that the resilient seal 502 may comprise any toriodal shape or geometry including an elliptical, square, rectangular, or polygonal-shaped torus.

Figure 12:
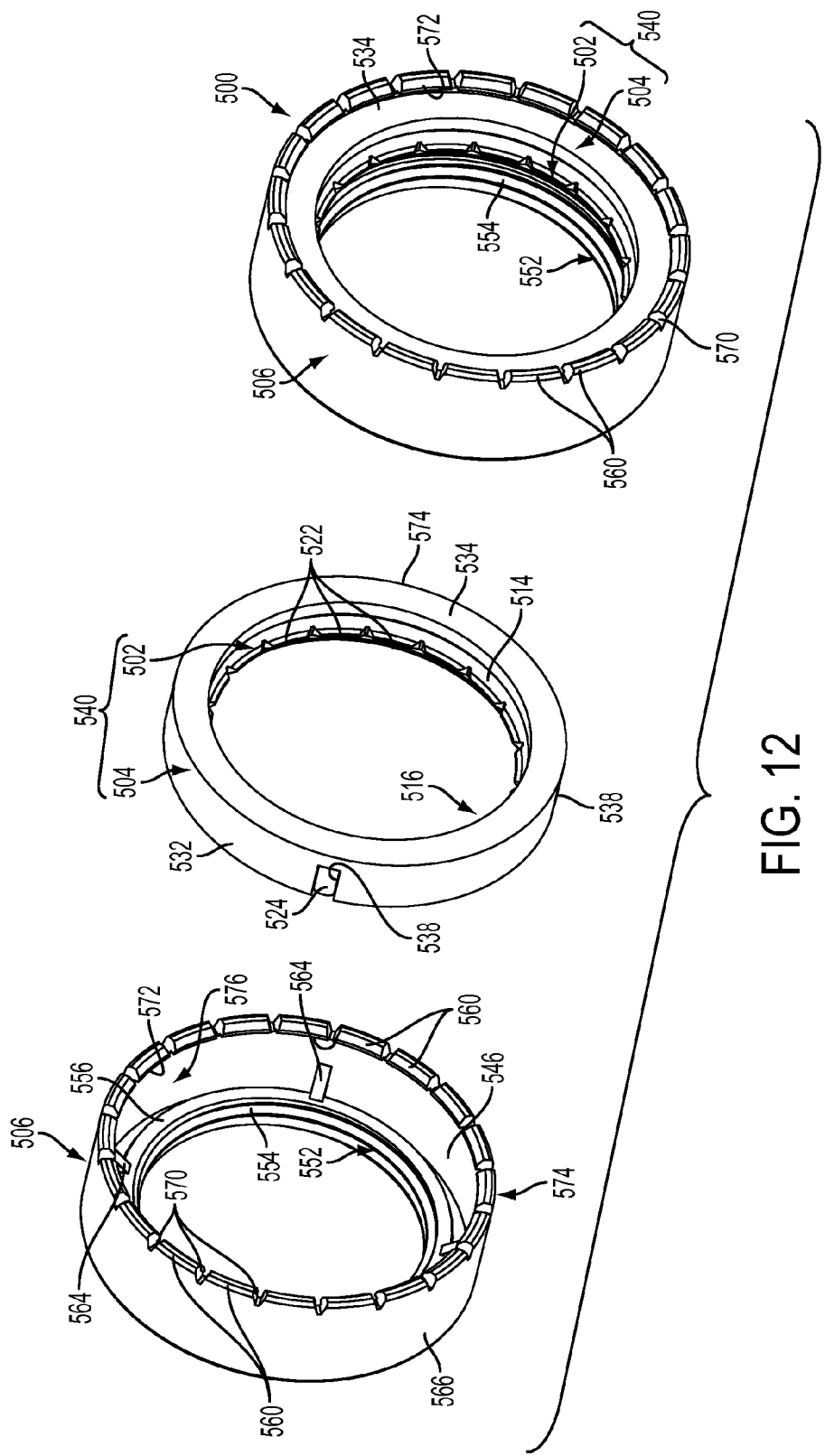
FIG. 12 depicts an exploded isometric view of the threaded interface seal wherein the resilient seal is received within a first annular cavity of the axial retainer to define a seal subassembly, wherein the seal subassembly is received within a second annular cavity of the axial retainer, and wherein threads of the interface port receive a threaded portion of the axial retainer.

The resilient seal 502 includes a peripheral or cylindrical outer surface 518, radial side surfaces 520 (only one side surface 520 is visible in the isometric view of FIG. 12), and at least one thread engager or radial segment 522 projecting inwardly from the annular ring 514. Additionally, the resilient seal 502 includes at least one torque coupling element 524 which projects radially outboard from the cylindrical outer surface 518 of the annular ring 514. In the described embodiment, the resilient seal 502 includes four (4) torque coupling elements 524 disposed at ninety-degree (90°) increments around the periphery of the outer surface 518. The radial side surfaces 520 are generally planar and disposed at right angles, or orthogonal, to the cylindrical outer surface 518.

In the described embodiment, the resilient seal 502 includes a plurality engagers or radial segments 522 disposed about an internal circumference of the annular ring 514. The circular opening 516 defines a diameter dimension D which corresponds to the root diameter dimension of a spiral thread 512 of the interface port 510. The radial segments 522 are segmented by a plurality of radial notches formed in the annular ring 514. Each radial segment 522 has a surface profile which generally compliments the shape of a spiral thread including, inter alia, the tooth profile, tooth face, crest diameter, root diameter, pitch angle, helix angle, etc.

In the described embodiment, the radial segments 522 collectively circumscribe a full three-hundred and sixty degree (360°) angle around the inner circumference of the ring 514. It should be appreciated, however, that the segments 522 may collectively span an arc which is less than, or greater than three-hundred and sixty degrees (360°). For example, the segments 522 may collectively circumscribe two or more spiral threads 512, e.g., seven hundred and twenty degrees (720°). Alternatively, the segments 522 may comprise three segments, each segment 522 being one-hundred and twenty degrees (120°).

In the described embodiment, each of the radial segments 522 has an arc length corresponding to an angle of between about twelve degrees (12°) to about eighteen degrees (18°). It should be appreciated that the segments 522 need not span a full revolution, i.e., three-hundred and sixty degrees (360°), inasmuch as the seal is not perpendicular to the threads 512. Rather, the seal assembly 500 is configured to prevent infiltration of water, moisture or other atmospheric contaminants in a circumferential direction around, or along the face of, each thread 512. Such a circumferential seal may be effected by a single segment 522, several segments 522 which are spaced apart, or a plurality of segments 522 spanning one or more revolutions around the annular ring 514. Further, it should be appreciated that, for a series of segments 522 traversing one or more revolutions, the beginning of the first segment will not align with the end of the last segment. Rather, the first segment will be staggered, or off-set, by a multiple of the pitch dimension. While segments 522 spanning several threads may be employed, segments 522 corresponding to a single thread will generally be sufficient to produce a reliable seal.

The resilient seal 502 includes segments 522 which closely match, or compliment, the face or tooth profile of the underlying thread 512. While each segment has a cross-sectional shape which closely matches the face, side or profile surfaces of the thread 512, the segment 522 is substantially planar. Furthermore, all of the segments 522 of the annular ring are initially formed in a common plane, i.e., the segments 522 are not molded so as to correspond to the helix or lead angle of the coupler threads 512. While the annular ring is not formed with the helix angle, at least one of the radial segments 522 may be caused to engage the face and root surfaces of the underlying thread 512, i.e., the corresponding arcuate segment of thread 512. More specifically, by segmenting the ring into a plurality of segments, e.g., eight (8), ten (10) or twelve (12), and deforming the seal 502 under load, the diameter dimension D may be caused to decrease such that at least one thread engager or radial segment 522 establishes an environmental seal with the threaded interface port 510. This feature of the disclosure will be discussed more fully when discussing the operation of the resilient seal 502, and its interaction with the axial and radial retainers 504, 506.

The radial retainer 504 includes a first cavity 530 defined by a radial retention sleeve 532 and a load transfer, or moveable compression, ring 534. The radial retention sleeve 532 is configured to receive the cylindrical outer surface 518 of the resilient seal 502 along a mating or complimentary cylindrical inner surface 536 of the first cavity 530. In the described embodiment, the radial retention sleeve 532 is bonded to the cylindrical inner surface 536 of the first annular cavity 530, however, it should be appreciated that the resilient seal 502 may sealably or frictionally engage the retention sleeve 532 of the radial retainer 504.

Notwithstanding the ability of the bonded/sealed/friction interface to transfer torque between, or across, the radial retainer 504 and resilient seal 502, the radial retention sleeve 532 may also include keyways 538 for accepting the torque coupling elements 524 of the resilient seal 502. Accordingly, torque may be driven from the radial retainer 504 to the resilient seal 502 through the keyways 538 of the retention sleeve 532. To facilitate the subsequent discussion, it will be useful to define the combined resilient seal 502 and radial retainer 504 as a seal subassembly 540 inasmuch as these elements cooperate as a unit when disposed in combination with the axial retainer 506 and threaded interface port 510.

In FIG. 12, the axial retainer 506 includes a cylindrical sleeve or adapter 546, a coupling ring 552 having a plurality of threads 554, and a static compression ring 556 disposed between, and integrally connecting, the cylindrical sleeve 546 to the coupling ring 552. More specifically, the cylindrical sleeve 546 includes: (i) a plurality of fingers 560 disposed along an outboard edge 562 of the cylindrical sleeve 546, (ii) at least one torque coupling element 564 projecting inwardly from an inner surface of the cylindrical sleeve 546, and (iii) a smooth regular or cylindrical sealing surface 566 disposed along the outer periphery of the sleeve 546. In the described embodiment, the fingers 560 are made radially compliant by a plurality of axial notches or slots 570 formed in, and along the outboard edge 562 of, the sleeve 546.

Each compliant finger 560 includes a radial shoulder 572 projecting inwardly for the purpose of capturing a circumferential edge 574 of the seal subassembly 540, i.e., a corner defined by the moveable compression ring 534 and the radial retention sleeve 532. More specifically, the seal subassembly 540 may be pressed into a second cavity 576 defined by the cylindrical sleeve 546 and the static compression ring 534 of the axial retainer 506. As the seal subassembly 540 is received within the cavity 576, the fingers 560 are displaced radially outboard until the retention sleeve 532 moves past the radial shoulder 572 of the respective finger 560. Once past, the fingers 560 return to their original position, causing the radial shoulder 572 of each respective finger 560 to engage the edge 574 of the moveable compression ring 534. As such, the seal subassembly 540 is captured within the cavity 576 of the axial retainer 506.

Additionally, once the seal subassembly 540 is fully received within, and captured by, the cavity 576, the torque coupling elements 564 engage the keyways 538 of the retention sleeve 532. Accordingly, torque applied to the axial retainer 506 may be transferred to the radial retainer 504 of the seal subassembly 540.

While in the illustrated embodiment, the fingers 560 are disposed along the entire outboard edge 562 of the cylindrical sleeve 546, the number of fingers 560 may be reduced provided that the fingers 560 are equally-spaced about the edge 562 to provide uniform retention. Furthermore, while four (4) torque coupling elements 564 engage keyways 538 of the retention sleeve 532, a single torque coupling element 564 may be employed to rotationally couple the seal subassembly 540 to the axial retainer 506.

Figure 13:
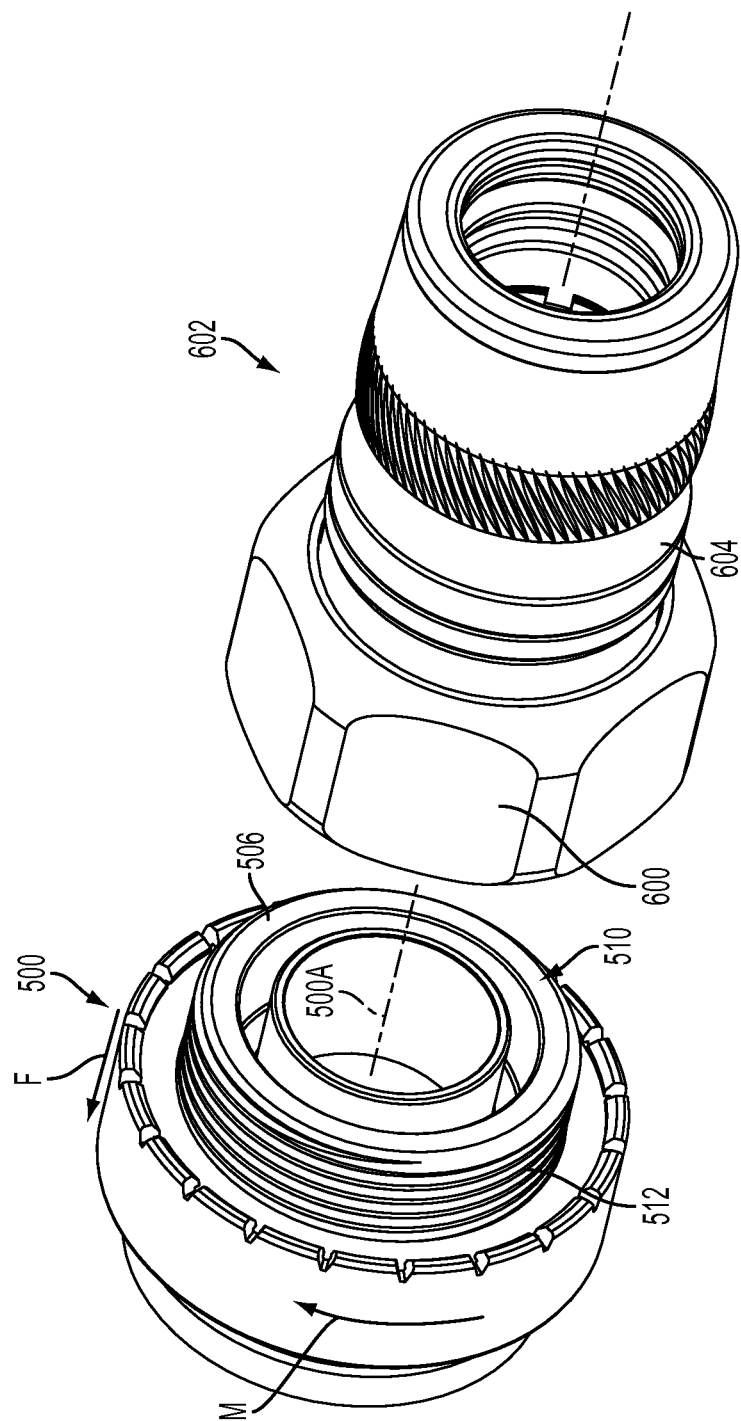
FIG. 13 depicts an isolated perspective view of the threaded interface seal, i.e., the seal assembly, disposed in combination with the interface port, and a coaxial cable connector.

In operation, and referring to FIGS. 12 and 13, the threads 554 of the seal assembly 500 engage the threads 512 of the interface port 510, i.e., by rotating the seal assembly 500 in a clockwise direction M about a rotational axis 500A. The seal assembly 500 is rotated until it is axially positioned proximal the inboard end of the interface port 510, i.e., in the forward direction F. In a next step, a coupler or threaded nut 600 of a coaxial cable connector 602 engages the threads 512 of the interface port 510 without fully tightening the connector body 604 or inner post (not shown) against a face surface 506 of the port 510.

Figure 14:
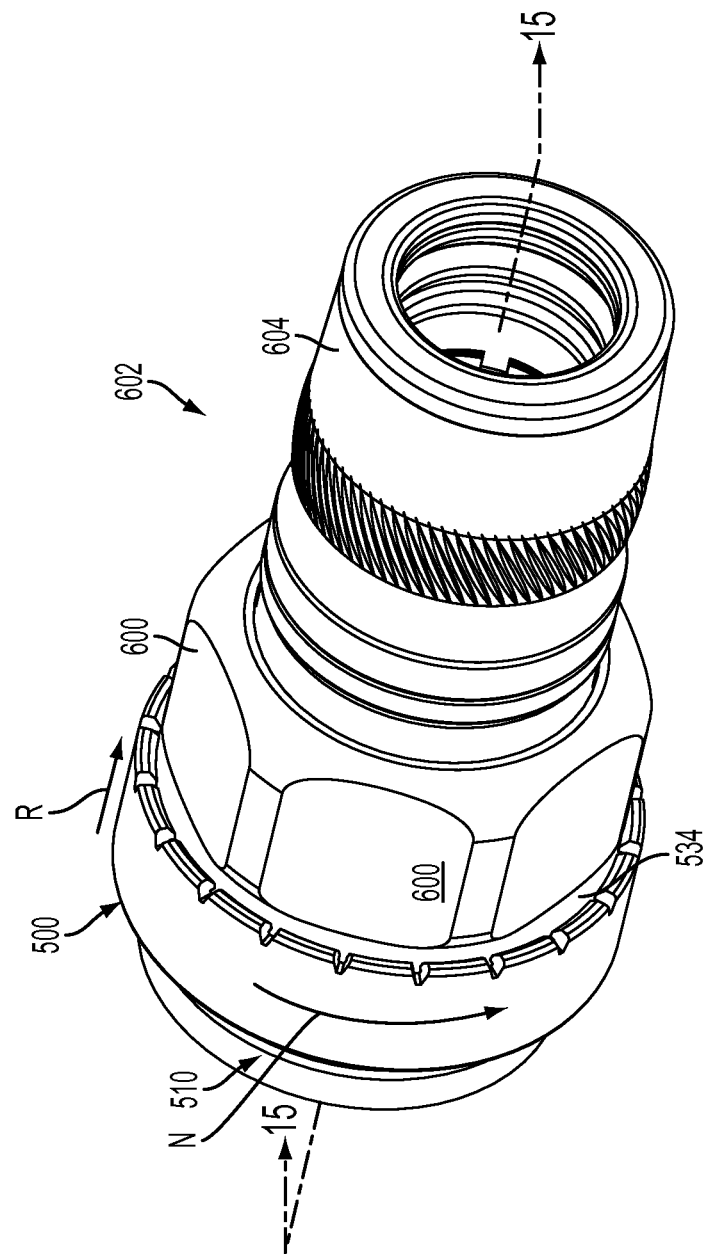
FIG. 14 depicts an isolated isometric view of a coaxial cable connector coupled to the interface port such that the seal assembly is positioned against, and adjacent to, a coupling device or threaded nut of the connector.
Figure 15:
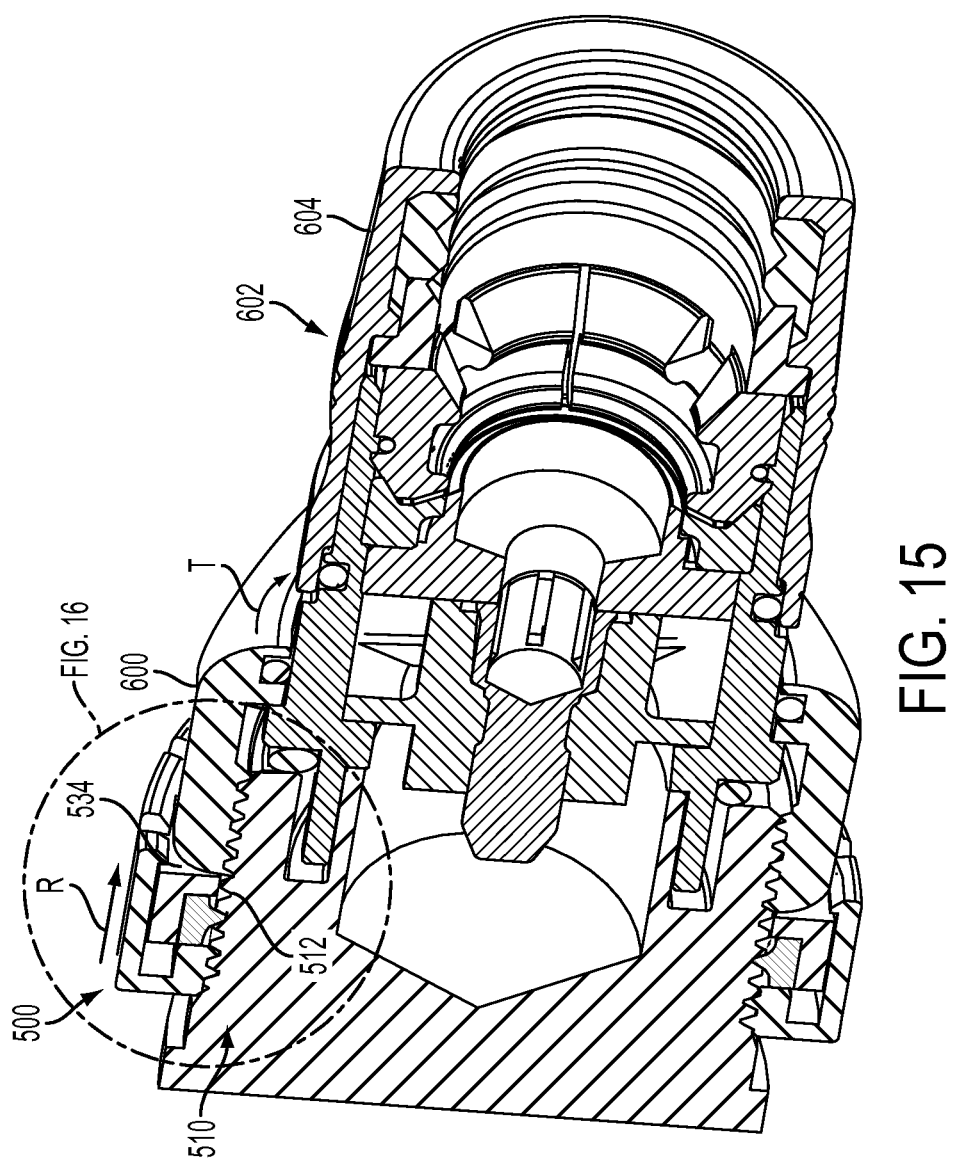
FIG. 15 is a sectional view taken substantially along line 15-15 of FIG. 14.

In FIGS. 14 and 15, the seal assembly 500 is then rotated in an opposite direction i.e., in the counter-clockwise direction N, such that the seal assembly 500 moves outwardly, i.e., in the rearward direction R. The seal assembly 500 is rotated until it abuts the face surface of the threaded nut 600. More specifically, the seal assembly 500 is rotated to cause the moveable compression ring 534 of the seal subassembly 540 to bear against the face surface of the threaded nut 600.

Figure 16:
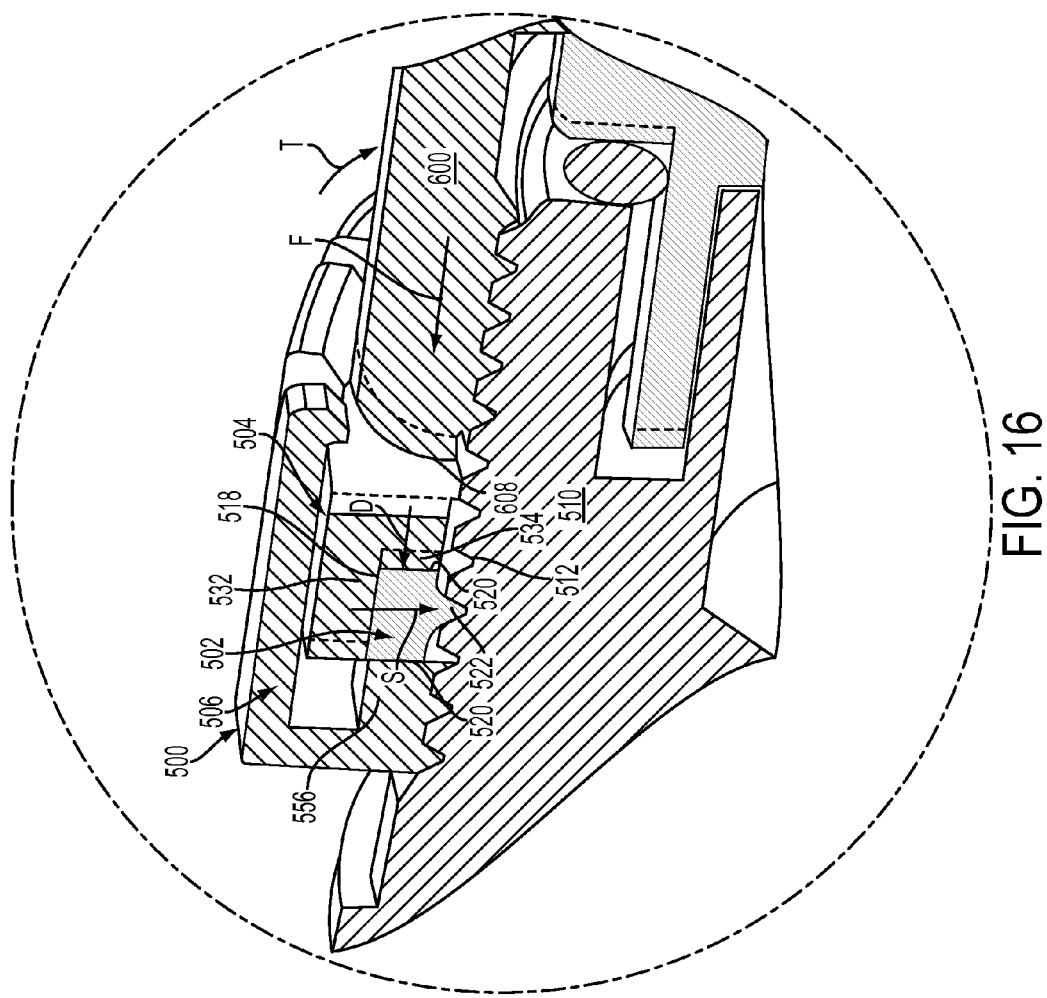
FIG. 16 is an enlarged, broken-away view of the seal assembly being deformed into a spiral thread of the interface port as the coupler of the connector threadably engages the interface port.

In FIG. 16, the threaded nut 600 of the coaxial cable connector 602 is then tightened against the seal assembly 500. As the nut 600 is tightened, i.e., rotated in the direction of arrow T, the face surface 608 of the nut 600 is urged against the moveable compression ring 534 of the radial retainer 504 (dashed lines depict an initial position of the relevant elements, i.e., the threaded nut 600, compression ring 534, and the resilient seal 502, and solid lines depict a final position of the respective elements 600, 534, 502.) More specifically, as the threaded nut 600 moves forward, i.e., in the axial direction of arrow F, axial loads are transferred across the moveable compression ring 534 to the resilient seal 502 causing the seal 502 to deform axially, i.e., in the direction of arrow D. Inasmuch as the axial retainer 506 is in threaded engagement with the interface port 510, the static compression ring 556 is held stationary to react the forces imposed on the moveable compression ring 534.

Additionally, as the resilient seal 502 deforms axially, the compliant material allows the seal to deform in unconstrained directions, i.e., as a function of the material Poison's ratio. Inasmuch as the retention sleeve 532 is constrained outwardly by the radial retainer 504 and axially by the moveable and static compression rings 534, 556, the resilient seal 502 can deform in no other direction than downwardly. That is, the axial force in the direction of arrow D causes the resilient seal 502 to deform downwardly in the direction of arrow S such that at least one of the flexible segments 522 is pressed into one of the spiral threads 512 of the interface port 510. Accordingly, an environmental seal is effected along the threaded interface port 510.

The seal assembly 500 therefore functions as a compression chamber to facilitate environmental seals with threaded or irregular surfaced interface ports. The seal assembly 500 is configured to be screwed onto a threaded interface port 510. When the connector 602 is screwed onto the interface port 510, the connector 602 drives the retainer 504 forward which, in turn, drives the inner seal 506 forward. The retainer 506 stops the movement of the seal 506, and the seal assembly 500 traps the seal 506. As the connector 602 continues to drive forward, the seal 506 expands and eventually physically engages the threaded surface of the interface port 510, deforming itself into the valleys of the threads. As such, the seal 506 establishes an environmental seal against the threaded port 510. It should be appreciated that, depending upon the embodiment, the seal 506 (and seal assembly 500) can form an environmental seal on smooth surfaced interface ports.

Figure 17:
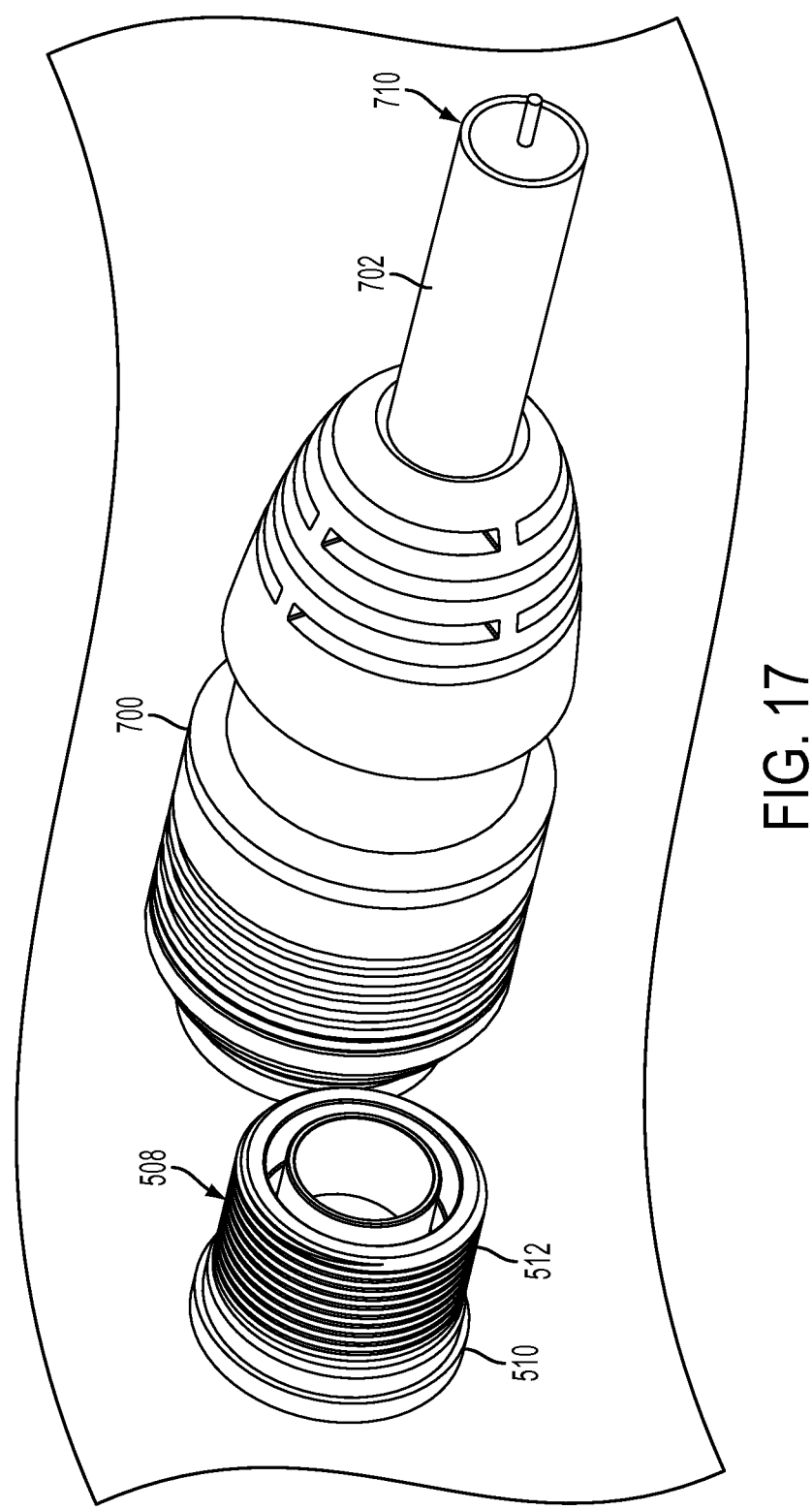
FIG. 17 is a view of a sealing boot positioned over, and sealing to, an outer cylindrical surface of the threaded interface seal at one end and to a coaxial cable at the other end.

In FIG. 17, the resilient seal produces a first seal with an irregular surface 508 of an interface port 510 such as a spiral thread 512 of a threaded interface port 510 and a second seal with a smooth regular surface 566. In this embodiment, the smooth regular surface 566 is sufficiently large to enable a rubber boot 700 having a corrugated or rubber ringed inner surface (not shown) to produce a second seal at the same axial location as the first seal. As such, the axial retainer 506 serves as an seal adaptor allowing the weather protection boot 700 to integrate with a non-standard threaded interface port 510. Additionally, the seal adaptor produces a weather protection system for a non-standard threaded interface port which needs no formable adhesives between mating interfaces, i.e., between the boot 700 and the cylindrical outer surface 566.

Figure 18:
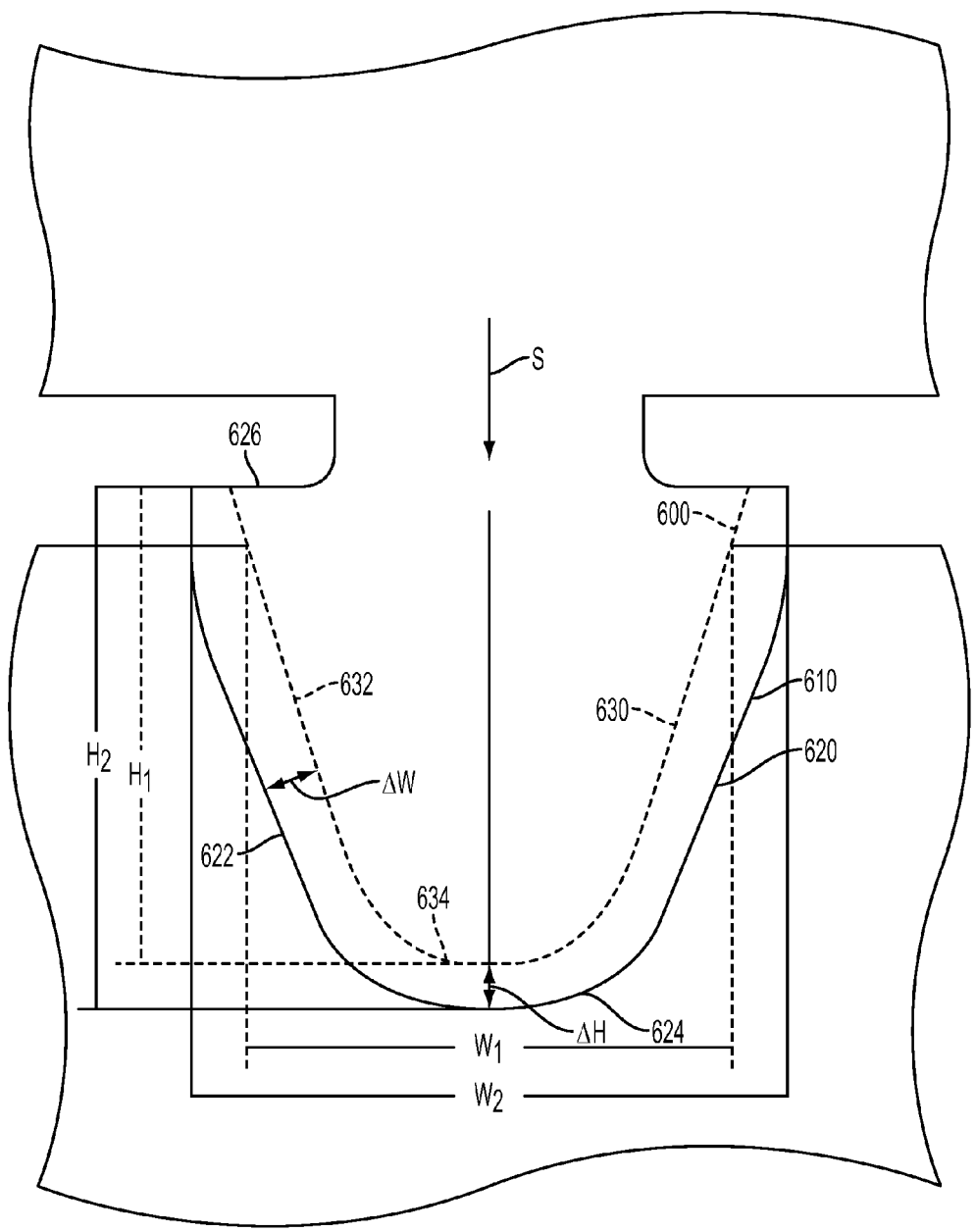
FIG. 18 is an enlarged cross-sectional view through one of the of resilient seal segments to view segment in a compressed and uncompressed states.

In FIG. 18, one embodiment of the seal assembly 500 includes a deformable seal 502 comprising an elastomer material having a Shore A hardness of between about thirty (30) to sixty (60). Furthermore, a cross-section of a segment 522 reveals the compressed and uncompressed states, i.e., in dashed and solid lines 600 and 610, respectively, of the deformable or resilient seal 502. The segment 522 includes first and second surfaces 620, 622 corresponding to the face surfaces 630, 632 of the underlying thread 512 and a third surface 624 corresponding to the root surface 634 of the thread 512. The width dimension W, between the first and second surfaces 620, 622, and the height dimension H, measured from the bottom of the third surface 624 to a top edge 626 of the segment 522, are oversized relative to the corresponding dimensions of the thread 512. More specifically, the width and height dimensions W, H are oversized such that in the uncompressed state, the first and second surfaces 620, 622 are between about eight percent (8%) to about twenty-five percent (25%) larger that the corresponding face surface dimensions of the thread 512.

Viewed from a different perspective, the thread segment 512 may be oversized such the change in width dimension $\Delta W$, and change in height dimension $\Delta H$, from the compressed to the uncompressed states is within a range of between about eight percent (8%) to about twenty-five percent (25%). In the embodiment shown, the change in width dimension $\Delta W$ is determined by the difference between W2 and W1 divided by 2 or (W2−W1)/2. The change in height dimension $\Delta H$ is simply equal to the difference between values H2 and H1, or H2−H1. The lower end of the range, i.e., the value of eight percent (8%), is a function of the minimum deformation necessary to ensure that the segment fills all surfaces of the underlying thread 512. This value takes into consideration a variety of factors including the manufacturing tolerances of the elastomer seal and the machined interface port. The upper end of the range, i.e., the value of twenty-five percent (25%) is driven by, or a function of, the maximum dimensions permissible while still accommodating hand or finger tightening of the resilient seal 502 relative to the threads 512 of the port. This value takes into consideration a variety of factors including the frictional drag or torque required to turn the seal subassembly 540 within the underlying threads. With respect to the Z-dimension, it will be recalled that the deformable seal 502 is segmented into eight (8) to (12) twelve segments which are substantially planar, i.e., do not follow a helix. As a result of rotating the seal 502 along the threaded interface, at least one of the segments 522 will work its way down to engage the face and root surfaces 620, 622, and 624 to produce a reliable seal along the circumference of the thread 512.

Additional embodiments include any one of the embodiments described above, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

The following is claimed:

1. A seal assembly for forming an irregular fitted seal with a threaded interface port and a sealing boot of a weather protection system, the seal assembly comprising:
    a seal member including a compliant ring having a plurality of resilient thread engaging segments configured to (i) extend inwardly from the ring structure, (ii) deformably fit with at least one of the threads of the interface port, and (iii) move between an uncompressed state, where the resilient thread engaging segment defines a first inner diameter dimension sized to allow the resilient thread engaging segment to fit into the at least one of the threads of the interface port, and a compressed state, where the resilient thread engaging portion has a second inner diameter dimension which is less than the first inner diameter dimension, the seal member being deformably pressed into at least one of the threads of the interface port so as to form a fitted seal with the at least one thread of the interface port and to prevent contaminants from infiltrating through the at least one thread of the interface port, when the seal member is in an assembled state;
    a first seal member retaining structure configured to fit around a portion of the seal member so as to form a seal subassembly, the first seal member retaining structure including a compression structure configured to cause the seal member to move from the uncompressed state to the compressed state, and
    a second seal member retaining structure including a coupling portion configured to be coupled to the threads of the interface port when the seal assembly is in the assembled state, and a resilient shoulder configured to extend inwardly and radially displaced between a closed position, where the resilient shoulder defines a first inner shoulder diameter dimension that is less than an outer diameter dimension of the seal subassembly, and an open position, where the resilient shoulder defines a second inner shoulder diameter dimension that is greater than the first inner shoulder diameter dimension and is greater than the outer diameter dimension of the seal subassembly so as to allow the seal subassembly to fit within a portion of the second seal member retaining structure.

2. A seal assembly comprising:
    a seal retainer defining a cavity and configured to be attached to an interface port; and,
    a deformable seal positioned within the cavity of the seal retainer and having an opening defining a diameter dimension, the deformable seal forming a ring and defining a plurality of arcuate segments extending inwardly toward an irregular surface of the interface port, the deformable seal configured to be positioned against a coupler of a coaxial cable connector and deformed in response to axial displacement of the coupler when the coaxial cable connector engages the interface port, the axial displacement of the coupler imposing an axial force against the deformable seal causing the diameter to decrease such that at least one of the arcuate segments engages a portion of the irregular surface to establish an environmental seal with the interface port.

3. The seal assembly of claim 2 wherein the irregular surface of the interface port comprises a plurality of spiral threads located around a periphery of the interface port.

4. The seal assembly of claim 2 wherein the irregular surface of the interface port comprises a root portion between adjacent threads extending around a periphery of the interface port.

5. The seal assembly of claim 2 wherein the irregular surface of the interface port comprises a non-linear surface located on an outer portion of the interface port.

6. The seal assembly of claim 2 wherein the seal member includes a torque transfer member extending outwardly from the ring structure, and the seal retainer includes a keyway configured to receive the torque transfer member for transmitting torque between the seal retainer and the seal member.

7. The seal assembly of claim 2 wherein the resilient thread engaging segment is disposed about an internal circumference of the ring structure.

8. The seal assembly of claim 2 wherein the arcuate segments comprise a plurality of resilient thread engaging segments each separated by a radial notch to allow each of the plurality of resilient thread engaging segments to move axially relative to each other.

9. The seal assembly of claim 2 wherein the threaded portion of the interface port comprises a spiral thread having a tooth-shaped profile, and wherein each of the resilient thread engaging segments is configured to match the tooth-shaped profile of the spiral thread.

10. A seal adaptor for a sealing boot, the seal adaptor configured to engage a spiral thread of an interface port, comprising:
  a seal subassembly comprising a compliant ring having plurality of arcuate segments defining an opening for accepting an interface port, the arcuate segments collectively traversing at least one revolution such that the beginning of one of the segments is offset relative to the end of another of the segments by the pitch of the spiral thread, and
  at least one retainer operative to retain the seal subassembly such that upon assembly an axial force imparted by a connector coupling device effects radial deformation of at least one of the flexible segments into an irregular surface of the interface port to effect a seal between the irregular surface and the retainer.

11. The seal adaptor of claim 10 wherein the at least one retainer includes an retainer operative to axially retain the seal subassembly against the coupling device of a coaxial cable connector upon assembly with the interface port.

12. The seal adaptor of claim 10 wherein the at least one retainer includes an retainer operative to radially retain the compliant ring such that the arcuate segments deform radially inwardly in response to axial displacement of the coupling device against the complaint ring.

13. The seal adaptor of claim 10 wherein the irregular surface of the interface port comprises a plurality of spiral threads located around a periphery of the interface port.

14. The seal adaptor of claim 13 wherein the at least one retainer includes a smooth outer peripheral surface configured to facilitate a seal between the outer peripheral surface and the sealing boot.

15. The seal adaptor of claim 10 wherein the at least one retainer includes a smooth outer peripheral surface configured to facilitate a seal between the outer peripheral surface and the sealing boot.

16. The seal adaptor of claim 10 wherein the arcuate segments comprise a plurality of resilient thread engaging segments each separated by a radial notch to allow each of the plurality of resilient thread engaging segments to move axially relative to each other.

17. The seal adaptor of claim 10 wherein the threaded portion of the interface port comprises a spiral thread having a tooth-shaped profile, and wherein each of the resilient thread engaging segments is configured to match the tooth-shaped profile of the spiral thread.

18. The seal adaptor of claim 10 wherein the at least one retainer includes a first retainer structure operative to axially retain the compliant ring of the seal subassembly along the length of the interface port, and a second retainer structure operative to radially retain the compliant ring of the seal subassembly to effect radially downward deformation of at least one of the arcuate segments in response to the axial force imposed by the coupler device.

19. The seal adaptor of claim 18 wherein the axial force deforms the arcuate segments against the irregular surface to form a seal between at least one of the arcuate segments and the irregular surface.

20. A seal assembly for a coaxial cable connector engaging an interface port having a spiral thread configure to engaging a coupling element of the connector, the seal assembly comprising:
  a seal retainer defining a cavity and configured engage the interface port; and,
  a deformable seal positioned within the cavity of the seal retainer and having an opening defining a diameter dimension, the deformable seal forming a circular ring defining at least two arcuate segments, disposed end-to-end in a circumferential direction about the opening and having a cross-sectional shape complementing the shape of the spiral thread, the arcuate segments traversing at least one revolution such that the beginning of the first segment is off-set relative to the end of the second segment by a multiple of a pitch dimension of the thread, the arcuate segments configured to be axially deformed upon engagement with the interface port such that the diameter dimension of the opening varies to radially engage and seal the spiral thread.

21. The seal assembly of claim 20 wherein the thread of the interface port comprises a root portion between adjacent threads and wherein the arcuate segments engage the root portion to seal the spiral thread.

22. The seal assembly of claim 20 wherein the arcuate segments are separated by a radial notch to allow each arcuate segments to move axially relative to each other upon installation.

23. The seal assembly of claim 20 wherein each of the resilient segments is configured to match a tooth-shaped profile of the spiral thread.

24. The seal assembly of claim 20 wherein each of the plurality of segments are disposed end-to-end in a circumferential direction about the opening.

* * * * *